United States Patent [19]

Hosaka et al.

[11] Patent Number: 4,460,651

[45] Date of Patent: Jul. 17, 1984

[54] MAGNETIC RECORDING MEDIUM

[75] Inventors: Akihiko Hosaka; Kiyotaka Okuyama; Kiyoto Kanazawa, all of Tokyo, Japan

[73] Assignee: TDK Corporation, Tokyo, Japan

[21] Appl. No.: 475,950

[22] Filed: Mar. 16, 1983

[30] Foreign Application Priority Data

Apr. 1, 1982 [JP] Japan ................................. 57-55018

[51] Int. Cl.³ ............................................. H01F 10/02
[52] U.S. Cl. .................................... 428/402; 428/457; 428/694; 428/702; 428/900
[58] Field of Search ............... 428/900, 402, 694, 457, 428/695, 702; 427/128-132, 48; 252/62.54

[56] References Cited

U.S. PATENT DOCUMENTS 4,404,238 9/1983 Baldwin .............................. 427/128

*Primary Examiner*—Bernard D. Pianalto
*Attorney, Agent, or Firm*—Oblon, Fisher, Spivak, McClelland & Maier

[57] ABSTRACT

A magnetic recording medium comprises a magnetic layer coated on a substrate and composed of ferromagnetic metal or alloy powder dispersed in a binder, wherein the magnetic layer contains $Al_2O_3$ having an average particle size of at most 1 $\mu$m and an $\alpha$-form rate of from 60 to 90%.

2 Claims, No Drawings

MAGNETIC RECORDING MEDIUM

The present invention relates to a magnetic recording medium having superior durability and remarkable effects to suppress the abrasion with a magnetic head, surface roughening and discoloration.

In recent years, there have been remarkable developments in magnetic recording devices as represented by the popularity of home VTR or the commercialization of high performance audio cassette tapes. Correspondingly, there has been an increasing demand that the magnetic recording media to be used in such devices have high density recording capability.

The magnetic recording medium which has been most widely used, is a magnetic tape or a magnetic sheet prepared by coating a magnetic layer on a non-magnetic substrate such as a polyester film. Among the magnetic powders to be used for the preparation of this magnetic layer, magnetic metal or alloy powder produced by a wet-type reduction method or a dry-type reduction method has recently been recognized as a prospective material suitable for high density magnetic recording. The magnetic recording medium using magnetic powder of this type has already been commercialized in the audio field. Further, in the field of magnetic tapes for VTR, these magnetic powders are expected to be used for the improvement of the S/N ratio or for the improvement of the frequency characteristic for high density recording, and various researches are being made to refine the particle size, to improve coercive force (Hc) and the residual magnetic flux density and, for the magnetic tapes, to improve the surface smoothness of the coated magnetic layer. The commercialization is expected to be soon.

However, the magnetic recording media in which such magnetic metal or alloy powder is used, has a great coercive force (Hc) and accordingly it is difficult to obtain adequate magnetic recording and reproduction characteristics by means of a conventional magnetic head such as ferrite or permalloy. When the coercive force (Hc) exceeds 1000 (Oe), it is necessary to use a magnetic metal or alloy head such as sendust or amorphous as the metal material. In fact, such a magnetic head has been proposed.

However, in the case of the combination of this magnetic recording medium and the above magnetic head, there have been difficulties such that the smoothness of the magnetic layer surface is required to be superior to the conventional iron oxide-type magnetic recording media, that an oxidation phenomenon is likely to be led because both the magnetic recording medium and the magnetic head are made of metal and that the smoothness of the magnetic recording medium is improved and accordingly the abrasion of the magnetic head will be reduced, whereby the heat generation will be accelerated by the high speed contact between the magnetic head and the magnetic layer surface and the binder and other additives contained in the magnetic layer tend to undergo decomposition and consequently the surface of the magnetic metal head will undergo oxidation discoloration, thus leading to head surface roughening. Accordingly, there have been serious drawbacks that the surface roughening of the magnetic layer and the magnetic head results in a spacing loss at the time of the magnetic recording and reproduction, whereby not only the magnetic recording and reproduction characteristics but also the S/N ratio which is critical to the image quality of the magnetic tape for VTR, will be degraded.

With respect to the iron oxide-type magnetic recording medium, it has been proposed to incorporate non-magnetic powder having a particle size of at most 5 μm and Mohs' hardness of at least 6 in an amount of about 1 to 25% by weight relative to the magnetic powder and thereby to improve the abrasion resistance and the durability of the magnetic layer. However, this conventional technique is not so effective or, in an extreme case, totally ineffective when applied to a magnetic recording medium composed mainly of magnetic metal or alloy powder, although it is effective when applied to a magnetic recording medium composed mainly of iron oxide-type magnetic powder.

The present inventors have conducted various experiments to solve the above-mentioned technical problems and as a result, have found that in the case of a magnetic recording medium using magnetic metal or alloy powder, it is possible to obtain a magnetic recording medium having superior durability and remarkable effects to suppress the abrasion with the magnetic head, surface roughening and discoloration, by incorporating $Al_2O_3$ having an average particle size of at most 1 μm and an α-form rate of at least 60% (i.e. at least 60% of $Al_2O_3$ is in the α-form), into the magnetic layer in an amount within a range of about 1 to 20% by weight relative to the above-mentioned magnetic powder.

Now, the present invention will be described in further detail with reference to Examples.

EXAMPLE 1

| | |
|---|---|
| Magnetic alloy powder | 1000 parts by weight |
| Dispersing agent (oleic acid) | 20 parts by weight |
| Lubricant | 12.5 parts by weight |
| Myristic acid | 5 |
| Butyl stearate | 7.5 |
| Polyurethane resin | 150 parts by weight |
| Nitrocellulose | 100 parts by weight |
| Methyl-ethyl ketone | 1100 parts by weight |
| Methyl-isobutyl ketone | 660 parts by weight |
| Cyclohexanone | 440 parts by weight |

The above components were introduced in a coating composition dispersing machine and thoroughly mixed and dispersed. Then, polyisocyanate as a crosslinking agent was added in an amount of 10% by weight based on the resin components, and the mixture was thoroughly stirred to obtain a uniform magnetic coating. This magnetic coating was applied onto a substrate made of a polyester film having a thickness of 14 μm to form a coating layer having a thickness of 6 μm. Then, the coating layer was subjected to super calender surface treatment and then cured at a temperature of 60° C. for 12 hours to obtain a tape material. This tape material was cut in width of 12.65 mm to obtain a video tape. This video tape is designated as Sample No. 1.

In the same manner as above, video tapes were prepared by incorporating 70% by weight of $Al_2O_3$ having various α-form rates as shown in Table 1 into the above-mentioned composition. These video tapes are designated as Sample Nos. 2 to 6.

TABLE 1

| Sample No. | α-form rate (%) | Average particle size (μm) | Amount (parts by weight) |
|---|---|---|---|
| 2 | 90 | 0.4 | 70 |

TABLE 1-continued

| Sample No. | α-form rate (%) | Average particle size (μm) | Amount (parts by weight) |
|---|---|---|---|
| 3 | 75 | 0.3 | 70 |
| 4 | 65 | 0.3 | 70 |
| 5 | 40 | 0.5 | 70 |
| 6 | 20 | 0.4 | 70 |

Each of the video tapes of Sample Nos. 1 to 6 was set in a video tape recorder and subjected to a running test for 30 hours, whereupon the discoloration of the surface of the sendust magnetic head of the video tape recorder, the reduction of the reproduction output, the S/N ratio at the time of further video recording and reproduction, and the wearing of the magnetic head were measured. The results thereby obtained are shown in Table 2.

TABLE 2

| Sample No. | Discoloration of the head surface | Reduction of output (dB) | Reduction of the S/N ratio due to head deterioration (dB) | Wearing of magnetic head (μm) |
|---|---|---|---|---|
| 1 | Great | Not measurable | Not measurable | Not measurable |
| 2 | None | −0.3 | −0.1 | 1.8 |
| 3 | None | −0.3 | −0.1 | 1.8 |
| 4 | Slight | −0.6 | −0.3 | 1.5 |
| 5 | Great | −1.5 | −0.9 | 0.8 |
| 6 | Great | −1.9 | −1.3 | 0.9 |

COMPARATIVE EXAMPLE 1

Video tapes (Sample Nos. 7 to 12) were prepared in the same manner as in Example 1 except that iron oxide powder was used has the ferromagnetic powder. These Samples 7 to 12 were subjected to running tests in the same manner as in Example 1. The results thereby obtained are shown in Table 3.

TABLE 3

| Sample No. | Discoloration of the head surface | Reduction of output (dB) | Reduction of the S/N ratio due to head deterioration (dB) | Wearing of magnetic head (μm) |
|---|---|---|---|---|
| 7 | Substantial | −4.2 | −3.8 | Not measurable |
| 8 | None | 0 | 0 | 15.5 |
| 9 | None | 0 | 0 | 16.0 |
| 10 | None | −0.1 | 0 | 15.0 |
| 11 | None | −0.5 | −0.2 | 11.0 |
| 12 | Slight | −0.4 | −0.2 | 11.5 |

COMPARATIVE EXAMPLE 2

Video tapes (Samples Nos. 13 to 15) were prepared in the same manner as in Example 1 except that SiC, $TiO_2$ and $Cr_2O_3$ were respectively used instead of $Al_2O_3$. These Sample Nos. 13 to 15 were subjected to the same running test as described in Example 1. The results thereby obtained are shown in Table 4.

TABLE 4

| Sample No. | Discoloration of the head surface | Reduction of output (dB) | Reduction of the S/N ratio due to head deterioration (dB) | Wearing of magnetic head (μm) |
|---|---|---|---|---|
| 2 | Slight | −0.3 | −0.1 | 1.8 |
| 13 | Great | −1.9 | −1.3 | 1.6 |
| 14 | Substantial | −1.7 | −1.6 | 1.7 |
| 15 | Substantial | −2.1 | −1.4 | 1.4 |

It is evident from Tables 1 and 2 that the magnetic recording medium of Sample No. 1 is inferior to Sample Nos. 2 to 6 in every respect of the various characteristics and it is not practically useful. Further, it is noted from Table 2 that even when $Al_2O_3$ is added, if the α-form rate is less than 60%, discoloration of the head surface occurs, thus leading to a reduction of the electromagnetic characteristic, although some improvement is observed with respect to the wearing of the magnetic head. Thus, in the magnetic recording medium wherein magnetic metal or alloy powder is used, the α-form rate of $Al_2O_3$ is required to be at least 60%.

It is evident from Table 3, when $Al_2O_3$ was added to the iron oxide-type magnetic powder, the wearing of the magnetic head increases to a great extent although substantial improvements are observed with respect to the discoloration of the head surface and electromagnetic characteristic. For this reason, these magnetic recording media can not practically be used. It is considered that one of the factors attributable to the increase of the wearing of the magnetic head is that the hardness of iron oxide is higher than that of the metal or alloy powder and this effect is coupled with the effect of addition of $Al_2O_3$ having a high α-form rate. Further, the improvement in the electromagnetic characteristic and the discoloration of the head surface is considered to be attributable to the fact that the magnetic layer of this type has an inherent stability against oxidation and the magnetic surface became very stable against the heat generation, etc.

Further, it is apparent from Table 4 that in the magnetic recording medium wherein magnetic metal or alloy powder is used, if SiC, $TiO_2$ or $Cr_2O_3$ is used instead of $Al_2O_3$, various characteristics such as the discoloration of the head surface, the reproduction output and the S/N ratio except for the wearing of the magnetic head, are degraded and such a magnetic recording medium is not yet practically useful.

As is apparent from the foregoing, when a magnetic recording medium is prepared with use of ferromagnetic metal or alloy powder, remarkable improvement in the characteristics can be obtained by incorporating $Al_2O_3$ having an α-form rate of at least 60%, as shown by Sample Nos. 2, 3 and 4. $Al_2O_3$ having an α-form rate of at least 60% should preferably have a particle size of at most 1 μm. If the particle size is greater than 1 μm, not only the dispersability at the time of preparing the magnetic coating will be impaired but also the surface of the magnetic layer thereby obtained tends to be rough due to these particles, whereby it is likely that the electromagnetic characteristic will be deteriorated, scratches on the magnetic head will be formed or the wearing of the magnetic head will increase.

Further, when using $Al_2O_3$ having an α-form rate of at least 60% and a particle size of at most 1 μm, it is preferred to incorporate it in an amount within a range of about 1 to 20% by weight relative to the magnetic powder. However, when $Al_2O_3$ has a relatively low α-form rate and a relatively small particle size, similar satisfactory effects for the improvement of the characteristics can be obtained by increasing the amount of addition to some extent.

Further, experiments have been conducted with use of a binder other than the one used in the above Examples, such as a polyester resin type, vinyl chloride-vinyl acetate copolymer resin type, epoxy resin type or phenol resin type binder, whereby it was confirmed that similar results are obtainable.

As described in the foregoing, the present invention provides a magnetic recording medium comprising a magnetic layer coated on a substrate and composed of ferromagnetic metal or alloy powder dispersed in a binder, wherein the magnetic layer contained $Al_2O_3$ having an average particle size of at most 1 $\mu$m and an $\alpha$-form rate of at least 60%, whereby the abrasion with the magnetic head, the surface roughening and the discoloration are remarkably suppressed. Thus, the present invention provides a magnetic recording medium useful for high density magnetic recording having superior durability.

We claim:

1. In a magnetic recording medium comprising a magnetic layer coated on a substrate and composed of ferromagnetic metal or alloy powder dispersed in a binder, an improvement wherein the magnetic layer contains $Al_2O_3$ having an average particle size of at most 1 $\mu$m and an $\alpha$ form rate of from 60 to 90%.

2. The magnetic recording medium according to claim 1 wherein the content of $Al_2O_3$ is within a range of about 1 to 20% by weight, based on the ferromagnetic powder.

* * * * *